United States Patent Office 3,085,502
Patented Apr. 16, 1963

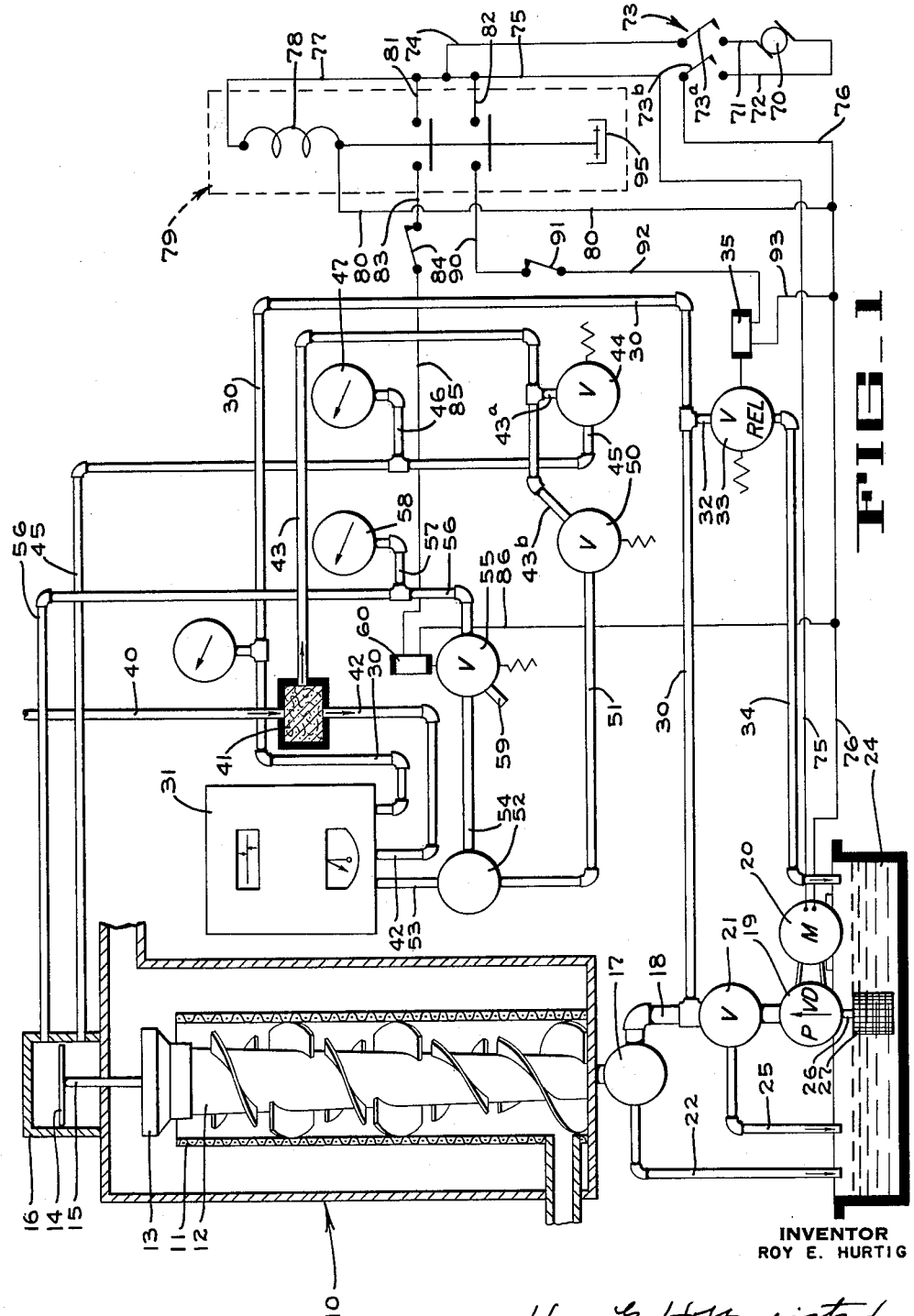

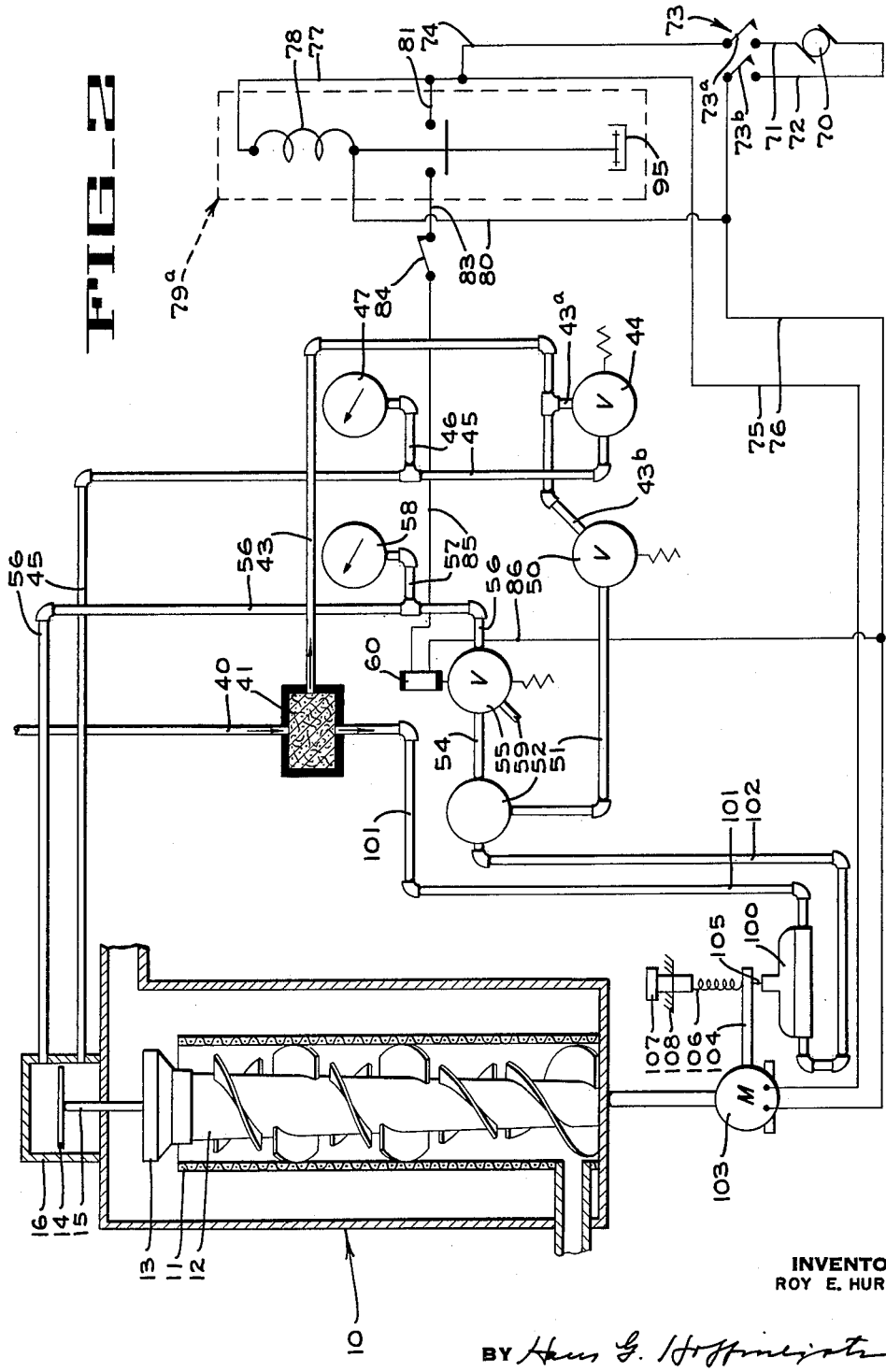

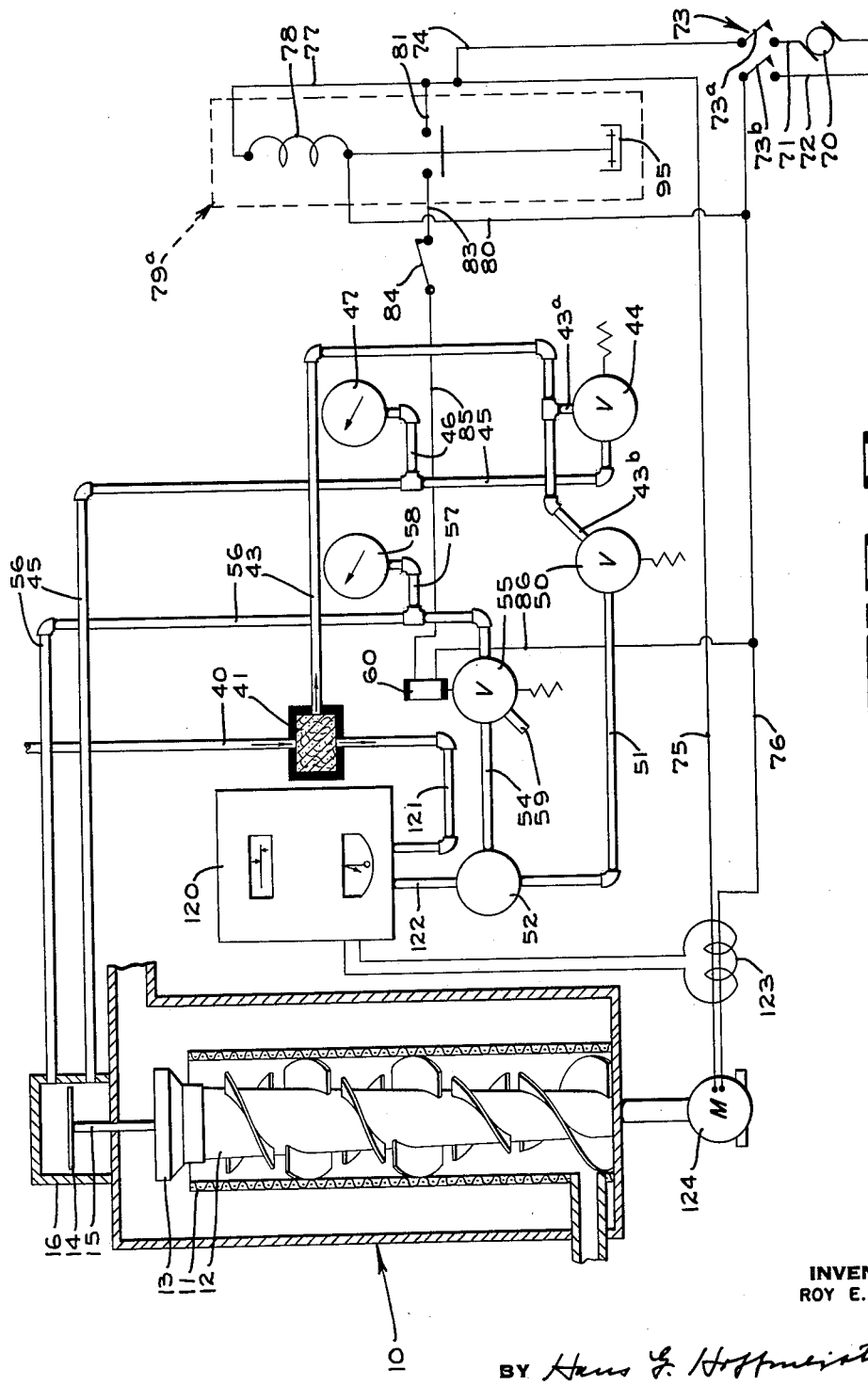

3,085,502
AUTOMATIC CHOKE CONTROL FOR A
SCREW PRESS
Roy E. Hurtig, San Jose, Calif., assignor to FMC
Corporation, a corporation of Delaware
Filed Aug. 15, 1958, Ser. No. 755,235
8 Claims. (Cl. 100—43)

This invention pertains to presses. More particularly, the present invention relates to an automatic system for continuously controlling the choke assembly of a screw press.

In pressing certain types of materials, for example, in the art of paper making, it is desirable to control within relatively close tolerances the moisture content of the material issuing from the press.

In practice it has been found that the moisture content of the material leaving the press is inversely proportional to the density of the material. It has been further noted that the torque required to rotate the press screw is directly proportional to the density of the material leaving the press.

An object of the present invention is to provide a system for automatically continuously adjusting the choke position of a press to maintain a uniform density, or moisture content, in the material issuing therefrom.

A further object of the invention is to provide a system wherein the choke is automatically and continuously positioned in response to variations in the amount of torque required to rotate the press screw.

Various other objects and advantages of the invention will become apparent from the following description and the accompanying drawings wherein:

FIG. 1 illustrates schematically one form of the present invention wherein the press screw is rotated by a hydraulic motor and the choke is controlled in response to variations in the pressure of the hydraulic line to the hydraulic motor.

FIG. 2 illustrates a modification wherein an electric drive motor is used, and the choke control is responsive to the back torque on said motor measured by a mechanical arrangement.

FIG. 3 illustrates a system similar to that shown in FIG. 2 wherein the control, however, is responsive to the current flow or power necessary to operate the drive motor.

In the control system schematically illustrated in FIG. 1, the press 10 comprises a cylindrical screen element 11 and a rotating conical screw 12 therewithin. A frustoconical choke 13 is slidably mounted on the upper end of the screw 12 for movement toward and away from the open upper end of the screen 11. Movement of the choke member 13 is effected by a piston 14 connected by a piston rod 15 to the choke member 13. The piston 14 is slidably received within a double acting pneumatic cylinder 16.

The screw 12 is rotated by a hydraulic motor 17 which in turn is driven by hydraulic fluid supplied through a conduit 18 from a variable delivery hydraulic pump 19 driven by an electric motor 20. A bypass valve 21 is inserted in the conduit 18 between the pump 19 and the motor 17 to limit the maximum pressure delivered to the motor 17. A fluid return conduit 22 is connected to the discharge side of the motor 17 and empties into a sump 24. Similarly, a discharge conduit 25 connects the discharge port of the bypass valve 21 with the sump 24. An inlet conduit 26 connects the intake side of the pump 19 with a strainer 27 immersed in the hydraulic fluid in the sump 24.

A hydraulic pressure conduit 30 is connected between the outlet side of the bypass valve 21 and a pressure controller 31. A branch conduit 32 connects the conduit 30 with a pressure relief valve 33 and a return conduit 34 connects the discharge side of the relief valve 33 with the sump 24. The relief valve 33 is a normally open valve and is adapted to be closed by the action of a solenoid actuator 35.

A compressed air supply conduit 40 is connected to any suitable compressed air supply and conducts air to a filter 41. A branch conduit 42 connects the filter with the inlet side of the controller 31. A second conduit 43 and a branch conduit 43a connects the filter with a pressure regulating valve 44, the discharge side of which is connected by a conduit 45 to the end of the pneumatic cylinder 16 which is closer to the press 10. A branch conduit 46 connects the conduit 45 with a pressure indicating instrument 47.

The conduit 43 and a branch conduit 43b connect the filter 41 with a pressure regulating valve 50, the discharge side of which is connected by conduit 51 with an intensifier 52. A conduit 53 connects the discharge side of the controller 31 with the intensifier 52. The intensifier 52, in the system shown, is such that the pressure existing in the conduit 53 entering the intensifier is multiplied by a factor of three so that the discharge of the intensifier through conduit 54 is three times the value of the pressure issuing from the controller. The conduit 54 is connected to a solenoid-actuated relief valve 55, the discharge side of which is connected by a conduit 56 to the end of the power cylinder 16 which is away from the press 10. A branch conduit 57 connects the conduit 56 with a pressure indicating instrument 58. When the valve 55 is in its normal position, the conduit 56 is connected to a discharge port indicated at 59. The valve 55 is adapted to be actuated by a solenoid 60 and when so actuated connects the conduit 56 to the conduit 54.

The electrical portion of the system comprises a generator or other source of power 70, one side of which is connected by a line 71 to one side of one pole 73a of a double pole master switch 73. The other side of the power source 70 is connected by a line 72 to one side of the other pole 73b of the master switch 73. The other side of the pole 73a of the master switch is connected by a line 74 and line 75 with one side of the main drive motor 20. The other side of the motor is connected by a line 76 to the other side of pole 73b of the master switch 73. The pole 73a of the master switch 73 is connected by line 74 and a line 77 to one side of the actuating coil 78 of a double contact time delay relay 79. The other side of the coil 78 is connected by line 80 to the line 76.

The pole 73a of the master switch 73 is connected by line 74 and lines 81 and 82, respectively, to one side of each of the two relay contacts of the relay 79. The other side of one of the relay contacts is connected by a line 83, a normally closed manual switch 84 and a line 85 to the previously described solenoid 60. The other side of the solenoid 60 is connected by line 86 with the line 76.

The other side of the second contact of the relay 79 is connected by a line 90, a manually actuated normally closed switch 91 and line 92 to the previously described solenoid 35. The other side of the solenoid 35 is connected by line 93 with the line 76.

The relay 79 has incorporated therein a dash pot arrangement 95 which delays the closing of the contacts of the relay when the coil 78 thereof is energized for purposes which will become apparent from the following description of the operation of the device.

In the operation of the system illustrated in FIG. 1, the regulator valve 44 is adjusted to provide a predetermined pressure beneath the piston 14 in the cylinder 16, said pressure being indicated on the pressure indicating instrument 47. After such adjustment said pressure remains constant during operation of the press. The regulator 50 is then adjusted to provide the maximum pressure desired above the piston 14 within the cylinder 16, said pressure being indicated on the pressure indicating instrument 58.

The master switch 73 is closed, thus energizing the electric motor 20 which is directly coupled to the pump 19. The motor is permitted to pick up speed without load since the relief valve 33 is in its open position permitting the output of the pump 19 to bypass through the conduits 30 and 32, the relief valve 33, and the conduit 34 back to the sump 24. After the predetermined time delay of the relay 79 has elapsed, the lower contacts thereof are closed thus energizing the solenoid 35 through the electric lines 74, 82, 90, switch 91, lines 92, 93 and 76. When the solenoid 35 is actuated, the relief valve 33 is closed and the output of the pump 19 is then channeled through the conduit 18 to the hydraulic motor 17 and commences rotation of the press screw 12. At the same time the hydraulic pressure actuating the motor 17 is channeled through the conduit 30 to the pressure input port of the controller 31. The input pressure from the conduit 30 into the controller 31 regulates the air pressure in the conduit 53 connecting the output port of the controller 31 with the intensifier 52. In this manner, the air pressure supplied through conduits 54, relief valve 55, and conduit 56 to the upper end of the cylinder 16 is regulated. It will be noted that the solenoid 60 has been actuated, simultaneously with the actuation of the solenoid 35, by the closing of the upper contact of the time delay relay 79, the electrical connection being made through lines 74, 81, 83, normally closed switch 84, lines 85, 86 and 76.

If for any reason it is desired to fully open the choke 13 this may be accomplished by manually opening the switch 84 and thus deactivating the solenoid 60. The deactivating of the solenoid 60 permits the valve 55 to move to its open position wherein the conduit 56 is connected to the discharge port 59 and the predetermined pressure constantly supplied below the piston 14 then raises the piston to move the choke 13 to its fully opened position. Similarly, if for any reason it is desired to stop the rotation of the screw 12, this may be accomplished by opening the normally closed switch 91, thus deactivating the solenoid 35 and permitting the relief valve 33 to move to its bypass position.

From the foregoing description it may be seen that an increase in the torque required to rotate the screw 12 will be reflected by an increase in the pressure in the hydraulic conduit 18 and thus an increase in the pressure in the conduit 30 leading to the controller 31. An increase in the pressure being delivered to the controller 31 results in a decrease in the air pressure in the controller discharge conduit 53 and thus a decrease in the pressure above the piston 14 within the cylinder 16. Since the pressure below the piston 14 is constant, the decrease in the differential pressure between that above and that below the piston 14 will result in the raising of the choke 13 permitting a greater discharge from the press 10 and, hence, a decrease in the torque necessary to rotate the screw 12.

In the control system illustrated in FIG. 2, the press 10 and its component parts are the same as those disclosed in FIG. 1 and are, therefore, given the same reference numerals as those used in connection with the system disclosed in FIG. 1. Similarly, the pressure regulator valve 44 which controls the pressure to the cylinder 16 below the piston 14 is the same as that disclosed in FIG. 1 and is, therefore, along with its associated conduits, given the same reference numerals as those used in conjunction with the corresponding parts of the system illustrated in FIG. 1. Similarly, the regulator valve 50, which controls the maximum pressure which can be applied to the upper end of the cylinder 16 above the piston 14 along with its associated conduits, the intensifier 52 and the relief valve 55 are the same as those described in the system shown in FIG. 1 and, hence, the same reference numerals are used to denote these elements of the system shown in FIG. 2.

The air supply conduit 40 and the filter 41 are the same as disclosed in FIG. 1. However, in the system disclosed in FIG. 2, the controller 31 has been replaced by a mechanically actuated pressure regulator valve 100, the input side of which is connected to the filter 41 by a conduit 101. The output side of the mechanically actuated pressure regulator 100 is connected to the input side of the intensifier 52 by a conduit 102.

None of the hydraulic mechanism disclosed in FIG. 1 is employed in the system illustrated in FIG. 2. It is replaced by an electric motor 103, the drive shaft of which is coupled to the screw 12 through a suitable reduction gear transmission (not shown). The stator of the motor 103 is rotatably mounted and has fixed thereto a radially extending arm 104 connected to the plunger 105 of the mechanical pressure regulator 100. A compression spring 106 is mounted between the opposite side of the arm 104 from the plunger 105 and a suitable pressure adjustment mechanism 107 connected to a suitable abutment surface 108.

Since the valve 33 shown in FIG. 1 is not employed in the structure shown in FIG. 2, the time delay relay 79 is replaced by a single contact time delay relay 79a which in all other respects is the same as the relay shown in FIG. 1. The single contacts of the relay 79a control the action of the relief valve 55 by activating and deactivating the solenoid actuator 60 and the same reference numerals as used in the description of FIG. 1, will, therefore, be applied to this electrical system. In all other respects, the electrical system shown in FIG. 2 is the same as that shown in FIG. 1 with the lines 75 and 76 now being connected to the electric drive motor 103.

In the operation of the system shown in FIG. 2, an increase in the torque necessary to rotate the screw 12 will be reflected in a reaction torque tending to rotate the housing of the electric motor 103 counterclockwise as shown in FIG. 2 thus rotating the arm 104 against the action of the compression spring 106. This permits the plunger 105 to rise, thus decreasing the pressure in the discharge condit 102 and thereby decreasing the pressure above the piston 14 in the manner described hereinabove with respect to FIG. 1. When the pressure above the piston 14 is decreased, the choke 13 is raised, thus decreasing the torque necessary to rotate the screw 12. Conversely, a decrease in the torque necessary to rotate the screw 12 will be reflected by clockwise movement of the arm 104 under the influence of the spring 106 thus moving the plunger 105 downwardly and increasing the pressure in the discharge conduit 102, resulting in an increase in the pressure above the piston 14 thereby causing the choke member 13 to move downwardly to decrease the size of the discharge opening in the press.

The control system illustrated in FIG. 3 is the same in all respects as that shown in FIG. 2, with the exception that the mechanical regulator 100 has been replaced by an electrically responsive controller 120, the air inlet port of which is connected by a conduit 121 with the filter 41 of the air supply system, and the regulated air discharge conduit 122 is connected to the intensifier 52. The controller 120 is connected by a watt meter type connection illustrated at 123 to the power lines 75 to 76 of the fixed electrical drive motor 124.

It may be seen that the pressure applied to the upper end of the cylinder 16 above the piston 14 in this system is, therefore, controlled in response to the amount of power required by the motor 124 and, hence, is inversely proportional to the torque necessary to rotate the screw 12, in a similar manner to that described in connection with the embodiments illustrated in FIGS. 1 and 2.

While three embodiments of the present invention are described herein, it should be noted that various changes may be made therein without departing from the spirit of the invention as defined in the appended claims.

Having thus described my invention, what I claim and desire to secure by Letters Patent is:

1. In a press structure having a cylindrical screen having a discharge end, a screw within the screen, drive means for rotating said screw, and a choke mounted for movement toward and away from the discharge end of said screen, the improvement which comprises a double acting pneumatic cylinder rigidly connected to the press screen, a piston in said cylinder connected to said choke, means for supplying air under a predetermined constant pressure to the side of said piston toward said screen, a pressure control unit responsive to incremental variations in the reaction torque on said drive means for incrementally regulating the admission of air pressure to the side of said piston away from said screen in inverse proportion to the incremental changes in said reaction torque, whereby the differential in the pressures on the opposite sides of said piston will continuously and incrementally control the positioning of said choke relative to said screen in proportion to the reaction torque of said drive means.

2. In a press structure having a cylindrical screen having discharge end, a screw within the screen, a hydraulic motor for rotating said screw, a conduit for supplying hydraulic fluid to said motor, and a choke mounted for movement toward and away from the discharge end of said screen, the improvement which comprises a pneumatic power cylinder mounted in fixed relation to the press screen, a piston in said cylinder connected to said choke, means responsive to the incremental changes in the hydraulic pressure in said conduit for continuously and incrementally controlling the admission of air pressure to said cylinder in inverse proportion to said hydraulic pressure at the side of said piston away from said choke, whereby the pressure on said piston will incrementally control the positioning of said choke relative to said screen in proportion to the hydraulic pressure in said conduit.

3. In a press structure having a cylindrical screen having a discharge end, a screw within the screen, a hydraulic motor for rotating said screw, a conduit for supplying hydraulic fluid to said motor, and a choke mounted for movement toward and away from the discharge end of said screen, the improvement which comprises a double acting pneumatic cylinder rigidly connected to the press screen, a piston in said cylinder connected to said choke, means for supplying air under a predetermined constant pressure to the side of said piston toward said screen, means responsive to the incremental changes in hydraulic pressure in said conduit for continuously and incrementally controlling the admission of air pressure to the side of said piston away from said screen in inverse proportion to said hydraulic pressure, whereby the differential in the pressures on the opposite sides of said piston will continuously and incrementally control the positioning of said choke relative to said screen in proportion to the hydraulic pressure in said conduit.

4. In a press structure having a cylindrical screen having a discharge end, a screw within the screen, a hydraulic motor for rotating said screw, a conduit for supplying hydraulic fluid to said motor, and a conical choke mounted for movement toward and away from the discharge end of said screen, the improvement which comprises a double acting pneumatic cylinder mounted in fixed relation to the press screen, a piston in said cylinder connected to said choke, means for supplying air under a predetermined constant pressure to the side of said piston toward said screen, a pressure control unit responsive to incremental changes in the hydraulic pressure in said conduit for continuously and incrementally regulating the admission of air pressure to the side of said piston away from said screen in inverse proportion to said hydraulic pressure, whereby the differential in the pressures on the opposite sides of said piston will continuously and incrementally control the positioning of said choke relative to said screen in proportion to the hydraulic pressure in said conduit.

5. In a press structure having a cylindrical screen having a discharge end, a screw within the screen, an electric motor for rotating said screw, the stator of said motor being mounted for rotary movement, and a choke mounted for movement toward and away from the discharge end of said screen, the improvement which comprises a double acting pneumatic cylinder mounted coaxially with relation to the press screen and rigidly connected therewith, a piston in said cylinder connected to said choke, means for supplying air under a predetermined constant pressure to the side of said piston toward said screen, a pressure regulator for continuously controlling the admission of air pressure to the side of said piston away from said screen, means fixed to said stator and connected to said pressure regulator, said means being responsive to increments of back rotation of said stator to control the output of said pressure regulator in inverse proportion to the amount of said back rotation, whereby the differential in the pressures on the opposite sides of said piston will continuously and incrementally control the positioning of said choke relative to said screen in proportion to the back rotation of said stator.

6. In a press structure having a cylindrical screen having a discharge end, a screw within the screen, an electric motor for rotating said screw, the stator of said motor being mounted for rotary movement, and a choke mounted for movement toward and away from the discharge end of said screen, the improvement which comprises a double acting pneumatic cylinder rigid with and coaxial with the press screen, a piston in said cylinder connected to said choke, means for supplying air under a predetermined constant pressure to the side of said piston toward said screen, a pressure control unit for continuously regulating the admission of air pressure to the side of said piston away from said screen, means carried by said stator and connected to said pressure control unit, said means being responsive to increments of back rotation of said stator to control the output of said pressure control unit in inverse proportion to the amount of said back rotation, whereby the differential in the pressures on the opposite sides of said piston will continuously and incrementally control the positioning of said choke relative to said screen in proportion to the back rotation of said stator, spring means for resisting the back rotation of said stator, and means for adjusting said spring means.

7. In a press structure having a cylindrical screen including a frame having a discharge end, a screw within the screen, an electric motor for rotating said screw, and a choke mounted for movement toward and away from the discharge end of said screen, the improvement which comprises a double acting pneumatic cylinder mounted on the press frame coaxially with said screen, a piston in said cylinder connected to said choke, means for supplying air under a predetermined constant pressure to the side of said piston toward said screen, means connected to the power lines of said motor for continuously and incrementally controlling the admission of air pressure to the side of said piston away from said screen in inverse proportion to incremental changes in the power supplied to said motor, whereby the differential in the pressures on the opposite sides of said piston will continuously and incrementally control the positioning of said choke relative to said screen in proportion to the power being supplied to said motor.

8. In a press including a tubular screen having a discharge opening, a choke mounted for movement toward and away from said discharge opening, a screw rotatably mounted within the screen for developing pressure between said screw and said choke, and drive means for rotating said screw, said drive means developing a reaction torque which varies incrementally as said press operates, the improvement which comprises fluid control means including double acting telescoping piston and cylinder portions, means mounting one of said portions in fixed axial relation with respect to said screen, means connecting the other of said portions to said choke for moving said choke toward and away from said discharge opening, means for continuously supplying a substantially constant pressure to said cylinder portion on the side of said piston portion tending to move said choke away from said discharge opening, and means interconnecting said drive means and said control means for incrementally changing the pressure in said cylinder portion on the opposite side of said piston portion in response to said incremental variations in said reaction torque, whereby the differential of said constant and changing pressures controls the positioning of the choke.

References Cited in the file of this patent
UNITED STATES PATENTS

| | | |
|---|---|---|
| 2,178,714 | Anderson | Nov. 7, 1939 |
| 2,340,009 | Meakin | Jan. 25, 1944 |
| 2,411,971 | MacMillin et al. | Dec. 3, 1946 |
| 2,545,938 | Bilbe | Mar. 20, 1951 |
| 2,817,287 | Onarheim et al. | Dec. 24, 1957 |